Figure 1:
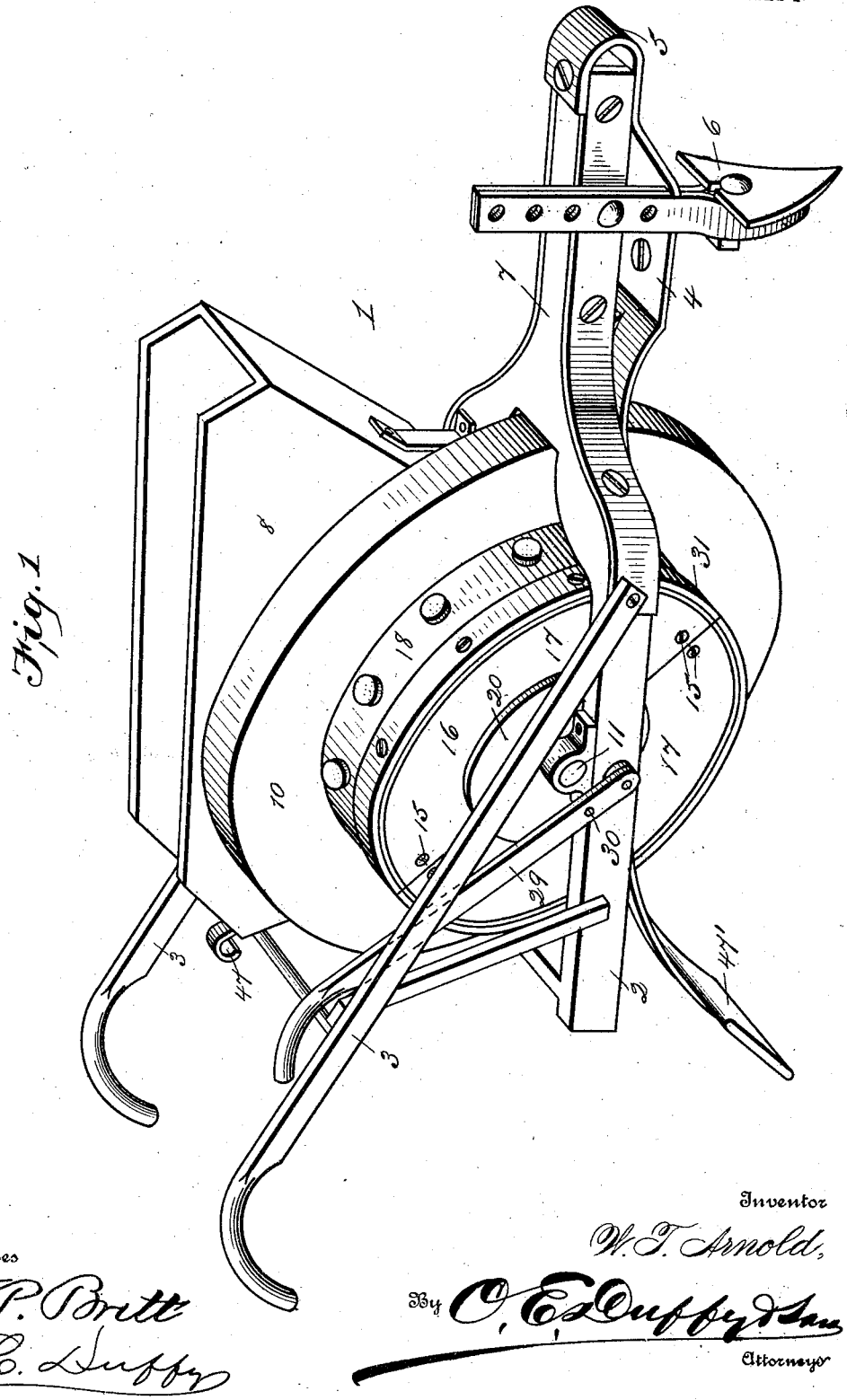

No. 772,329. PATENTED OCT. 18, 1904.
W. T. ARNOLD.
PLANTER.
APPLICATION FILED AUG. 28, 1903.
NO MODEL. 3 SHEETS—SHEET 1.

Witnesses
J. P. Britt
E. C. Duffy

Inventor
W. T. Arnold,
By C. E. Duffy & Son
Attorneys

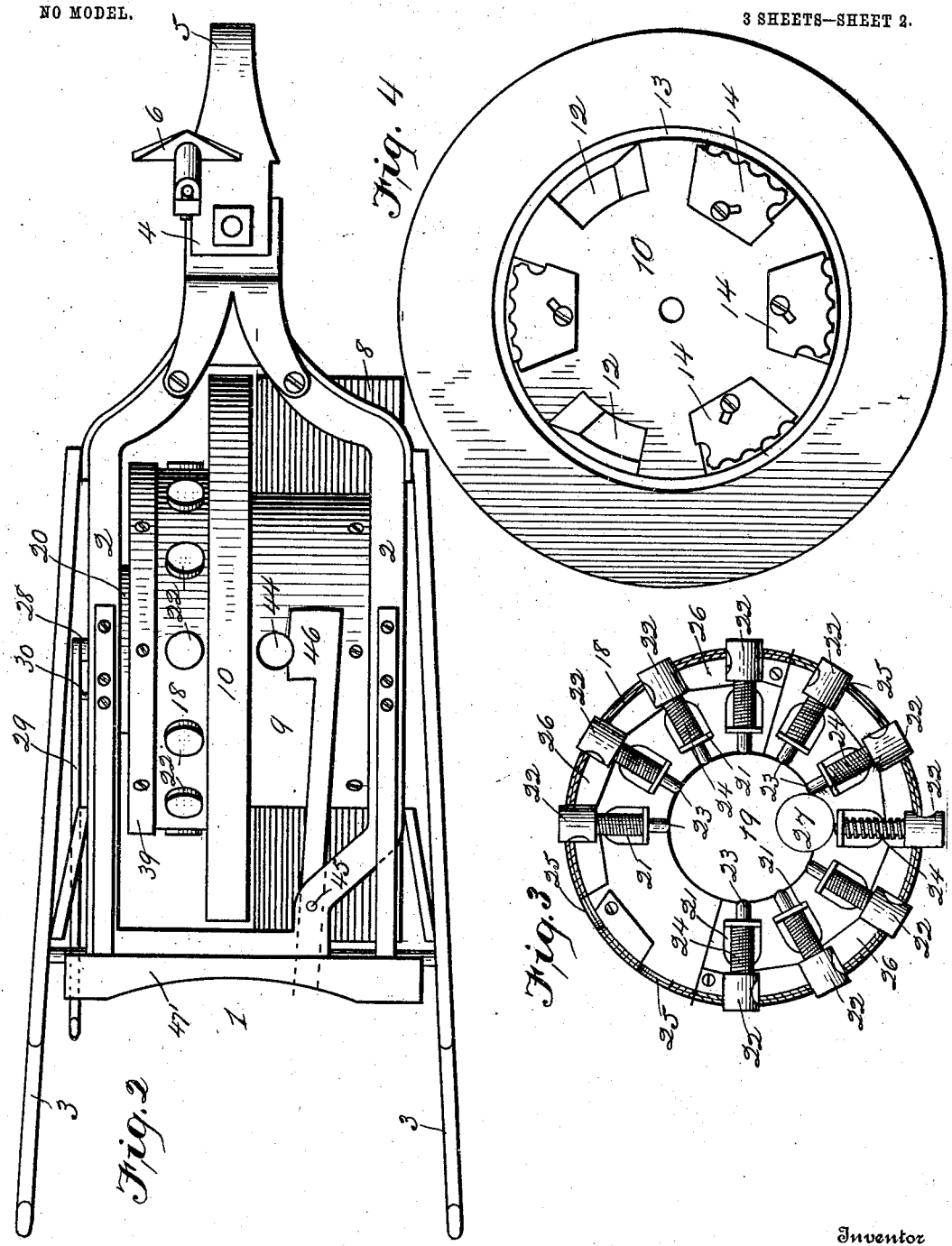

No. 772,329. PATENTED OCT. 18, 1904.
W. T. ARNOLD.
PLANTER.
APPLICATION FILED AUG. 28, 1903.
NO MODEL. 3 SHEETS—SHEET 3.
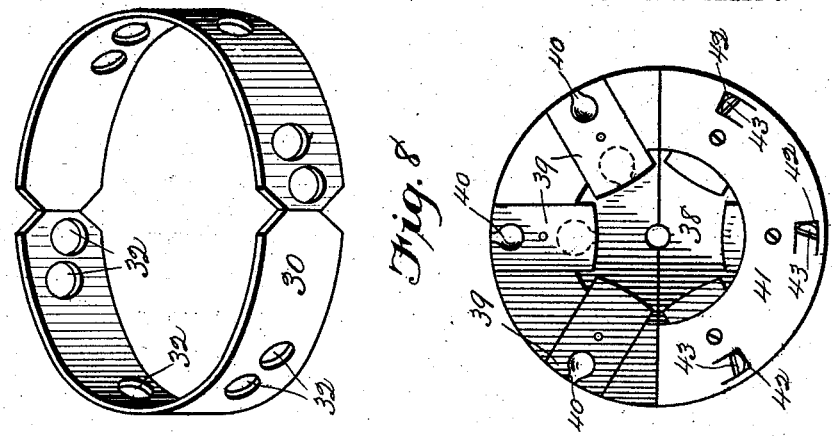
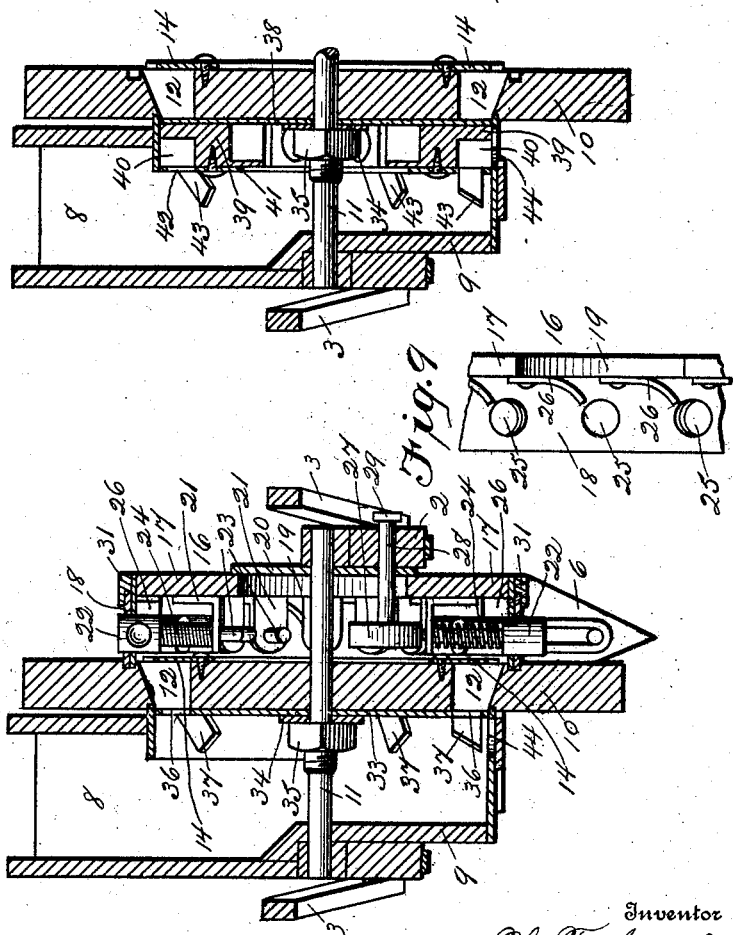
Witnesses
J. P. Britt
E. C. Duffy
Inventor
W. T. Arnold,
By O. E. Duffy & Son
Attorneys No. 772,329. Patented October 18, 1904.

UNITED STATES PATENT OFFICE.

WILLIAM THOMAS ARNOLD, OF ATLANTA, GEORGIA.

PLANTER.

SPECIFICATION forming part of Letters Patent No. 772,329, dated October 18, 1904.

Application filed August 28, 1903. Serial No. 171,083. (No model.)

*To all whom it may concern:*

Be it known that I, WILLIAM THOMAS ARNOLD, a citizen of the United States, residing at Atlanta, in the county of Fulton and State of Georgia, have invented certain new and useful Improvements in Planters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to planters, and has for its object to provide a device of this class designed to plant seed, such as cotton, peas, corn, &c.

With this object in view my invention consists in the arrangement which will provide for planting the seed at different intervals.

My invention also consists in the construction and arrangement of parts of the planter, and particularly in the mechanism for carrying and operating the seed-cups, all of which novel features will be first fully described and afterward specifically pointed out in the appended claims.

Referring to the accompanying drawings, Figure 1 is a perspective view of my planter. Fig. 2 is a bottom plan view of same. Fig. 3 is an interior view of the revolving hopper. Fig. 4 is an elevation of wheel with revolving hopper removed. Fig. 5 is a vertical cross-section through center of planter, showing feed-disks employed to distribute the seed into the rotating hopper. Fig. 6 is a like view illustrating the construction employed to distribute the seed directly from the seed-hopper. Fig. 7 is a perspective view of reversible band which is employed when desired to plant seed at different intervals. Fig. 8 is a plan of distributing mechanism shown in Fig. 6 with one semicircular plate removed, and Fig. 9 is a fragmentary view of section of interior of rotating hopper.

Like numerals of reference indicate the same parts throughout the several figures, in which—

1 indicates the planter, comprising the frame 2 and handles 3.

4 indicates a bracket, which also forms the clevis 5, and 6 indicates the adjustable drill-tooth braced by said brackets, said tooth and standard being reversible, so as to be capable of attachment to the opposite side of the beam 7 for a purpose which will be presently described.

8 indicates the hopper shaped as shown in Fig. 1 and which has a semicircular bottom 9.

10 indicates the rotating wheel secured on the shaft 11, said wheel being provided with a series of openings 12, Fig. 4, and an annular groove 13, within which the semicircular bottom portion of the hopper extends, so that said wheel can rotate without spilling any seed from the hopper. On the outer face of said wheel 10 I provide an adjustable guard-plate 14 over each opening 12 to be adjusted for different kinds and sizes of seeds and to control the quantity thereof which passes through said openings. Secured on the outer side of said wheel by means of the screws 15 is the rotating hopper 16, composed of the semicircular face-plates 17 and the perforated band 18. A large central opening 19 is formed in said face-plates, Fig. 3, and a disk 20, Fig. 1, covers the same. Secured on the inner side of said face-plates 17 are a series of angle-brackets 21, Fig. 3, which may be adjustable, carrying the seed-cups 22, which are secured on arms 23. Springs 24 are interposed on said arms between said brackets 21 and the seed-cups, which normally hold said cups within the rotating hopper. The band 18 is provided with a series of perforations 25, through which said cups protrude, and when said cups are in their normal position they entirely close said perforations, as shown in Fig. 3.

Secured to the inner side of the face-plates 17 of the rotating hopper are a series of guides 26, so located and arranged as to guide the seed into the seed-cups when said hopper is rotating, as shown in Fig. 9.

27 indicates an eccentrically-located roller journaled on a laterally-movable shaft 28, passing into the rotating hopper and secured to an operating-handle 29, pivoted at 30 on the frame 2. As shown in Fig. 3, the seedcup-holding pins 23 engage said eccentric roller 27, which forces said cups out of the hopper, causing them to drop their seed. By a lateral movement of the operating-handle 29 the said eccentric roller is moved laterally out of line with said seed-cup pins, so that the hopper can rotate without operating the seed-cups, as may frequently be desired.

In order to arrange the machine to drop seed only at certain intervals, I have provided the reversible band 30, Fig. 7, which is secured around the outer perforated band 18 of the rotating hopper by means of securing-strip 31, Fig. 1. It will be seen from Fig. 7 that the perforations 32 in said band are eccentrically located and so arranged that they will register with every second perforation of the outer band of the rotating hopper, or by reversing said reversible band the eccentric perforations 32 thereof will register with every third perforation of the outer band of the rotating hopper, so that by removing the seed-cups 22 from the rotating hopper which would be covered by the reversible band only every second or every third seed-cup will drop seed, thus making it possible to increase or diminish the distance between every discharge of the seed.

To pass now to Figs. 5 and 6, it will be seen that I have constructed means for dropping the seed directly and independently from the stationary hopper and also for leading the seed therefrom into the revolving hopper to be deposited by the seed-cups or strewn continuously when said cups are removed and perforated bands properly adjusted. In the latter instance I employ a disk 33, formed of two semicircular sections which are inserted in the stationary hopper and held rigidly in engagement with the inner face of the rotating wheel 10 by means of the washer 34 and jam-nut 35 on the shaft 11. Said disk is provided with a series of openings 36 therein registering with every opening 12 through the rotating wheel and a guide 37 at each opening for forcing the seed into the rotating wheel as said disk rotates in the seed in the stationary hopper. The seed falling into the rotating hopper 16 is deposited by the seed-cups, or when said seed-cups are detached or removed then deposited continuously, as before described. In order, however, to distribute the seed directly from the stationary hopper, the said disk 33 is removed and the disk 38, Fig. 8, is employed instead. This disk has no openings leading into the revolving wheel, but is provided with a series of reversible (preferably wooden) blocks 39, Fig. 8, secured thereto, which are provided with an opening 40 therein, through which the seed passes. On the reverse side and end of said blocks I provide a similar opening, but larger, as shown in dotted lines, so that by reversing the blocks a greater quantity of seed can be distributed. In order to hold these blocks in position and guide the seed thereto, I employ a disk 41, composed of two semicircular sections with openings 42 therein registering with the openings in said blocks and with a guide 43 for each opening to force the seed into the blocks when said disk is rotating in the seed. In Fig. 8 I show only one section of the disk, the other being removed to show the blocks. In the bottom of the stationary hopper 9 I provide an opening 44, Fig. 2, through which the seed passes from the blocks 39, and pivoted to the frame 2 at 45 is a cover 46, adapted to be moved over said opening 44 when the seed is being discharged from the rotating hopper. A handle 47, Fig. 1, is formed on said cover for the purpose of moving said cover at will when the machine is in operation. The drill-tooth 6, as shown in Fig. 1, is in position for operation when the seed is being discharged from the rotating hopper, while it is reversed to the other side of the beam when discharging seed from the stationary hopper. Secured behind said rotating wheel is the coverer 47', which covers the seed after having been dropped.

Having thus set forth my invention, I do not wish to be understood as limiting myself to the exact construction herein set forth, as various slight changes may be made therein by those skilled in the art which would fall within the limit and scope of my invention, and I consider myself clearly entitled to all such changes and modifications.

What I claim as my invention, and desire to secure by Letters Patent of the United States, is—

1. In a planter, the combination of a hopper and a rotating wheel, a rotating hopper on said wheel, seed-cups adapted to be carried in said hopper, means within said hopper for forcing said seed-cups beyond the periphery of said hopper.

2. In a planter the combination of a hopper and a rotating wheel, a rotating hopper carried on said wheel, seed-cups carried in said hopper and means for guiding the seed into said seed-cups.

3. In a planter, the combination of a hopper and a rotating wheel, a rotating hopper carried on said wheel means for leading the seed into said rotating hopper, and means for varying the quantity of seed fed to said rotating hopper.

4. In a planter, the combination of a hopper and a rotating wheel, a hopper carried on said wheel and provided with a series of openings, seed-cups in said rotating wheel, means for forcing said cups through said openings, and means for covering a portion of said openings to limit the discharge of seed.

5. In a planter, the combination of a hopper, a rotating wheel and a hopper carried thereby provided with a series of openings, a reversible band provided with perforations adapted to be secured to said latter hopper to cover a portion of the openings therein.

6. In a planter, the combination of a rotating wheel and a hopper carried thereon, means in said hopper for discharging the seed at intervals and means around said hopper for regulating the intervals between each discharge.

7. In a planter, the combination of a rotating wheel and a hopper carried thereon, seed-cup carried in said hopper for discharging the seed therefrom, and a reversible band adapted to be secured around said hopper to regulate the intervals between each discharge.

8. In a planter, the combination of a rotating wheel and a hopper carried thereon, seed-cups carried in said hopper, means in said hopper for forcing said cups out of said hopper and means for moving said forcing means out of line with said cups.

9. In a planter, the combination of a stationary hopper, a rotating wheel and a rotating hopper carried thereon, seed-cups within said rotating hopper, arms upon which said cups are mounted, an eccentrically-located element in said rotating hopper normally in line with the said arms and adapted to be engaged thereby to force said cups out of said hopper, and means for moving said element out of line with said arms.

In testimony whereof I affix my signature in presence of two witnesses.

WILLIAM THOMAS ARNOLD.

Witnesses:
FREDERICK SHANNON,
LEONARD JAMES.